United States Patent [19]
Dvorkis et al.

[11] Patent Number: 5,581,070
[45] Date of Patent: Dec. 3, 1996

[54] OMNI-DIRECTIONAL SCAN PATTERN GENERATOR IN ELECTRO-OPTICAL SCANNERS

[75] Inventors: Paul Dvorkis, Stony Brook; Howard Shepard, Great Neck; Simon Bard; Joseph Katz, both of Stony Brook; Edward Barkan, Setauket, all of N.Y.

[73] Assignee: Symbol Technologies, Inc., Holtsville, N.Y.

[21] Appl. No.: 467,124

[22] Filed: Jun. 6, 1995

Related U.S. Application Data

[60] Continuation of Ser. No. 108,521, Jul. 19, 1993, abandoned, which is a division of Ser. No. 868,401, Apr. 14, 1992, Pat. No. 5,280,165, which is a division of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.[6] ................................................ G06K 7/10
[52] U.S. Cl. ................................... 235/462; 235/467
[58] Field of Search ............................... 235/462, 472, 235/454, 470, 467

[56] References Cited

U.S. PATENT DOCUMENTS

| | | | |
|---|---|---|---|
| 2,989,643 | 6/1961 | Scanlon | 250/230 |
| 3,981,566 | 9/1976 | Frank et al. | 359/224 |
| 3,998,092 | 12/1976 | Maccabee | 73/655 |
| 3,999,833 | 12/1976 | Reich et al. | 359/214 |
| 4,021,096 | 5/1977 | Dragt | 359/223 |
| 4,057,331 | 11/1977 | Ong et al. | 359/224 |
| 4,123,146 | 10/1978 | Dragt | 359/225 |
| 4,230,393 | 10/1980 | Burke, Jr. | 359/220 |
| 4,302,709 | 11/1981 | Tichtinsky | 318/116 |
| 4,502,752 | 3/1985 | Montagu | 359/199 |
| 4,632,501 | 12/1986 | Glynn | 359/199 |
| 4,732,440 | 3/1988 | Gadhok | 359/214 |
| 4,878,721 | 11/1989 | Paulsen | 359/214 |
| 4,902,083 | 2/1990 | Wells | 359/214 |
| 4,919,500 | 4/1990 | Paulsen | 359/214 |
| 4,930,848 | 6/1990 | Knowles | 359/214 |
| 4,959,568 | 9/1990 | Stokes | 310/51 |
| 5,168,149 | 12/1992 | Dvorkis et al. | 235/472 |
| 5,245,463 | 9/1993 | Goto | 359/214 |
| 5,280,165 | 1/1994 | Dvorkis et al. | 235/470 |

FOREIGN PATENT DOCUMENTS

| | | |
|---|---|---|
| 0344882 | 12/1989 | European Pat. Off. . |
| 0471291 | 2/1992 | European Pat. Off. . |
| 63-34508 | 2/1985 | Japan . |
| 60-07017 | 6/1985 | Japan . |
| 6-12513 | 1/1994 | Japan . |
| 2097148 | 10/1982 | United Kingdom . |
| 2175705 | 12/1986 | United Kingdom . |
| 89/22223 | 12/1989 | WIPO . |

*Primary Examiner*—Donald T. Hajec
*Assistant Examiner*—Karl Frech
*Attorney, Agent, or Firm*—Kirschtein et al.

[57] ABSTRACT

High speed scanning arrangements in scanners for reading bar code symbols by oscillating a scanner component in single or multi-axis scan patterns.

16 Claims, 3 Drawing Sheets

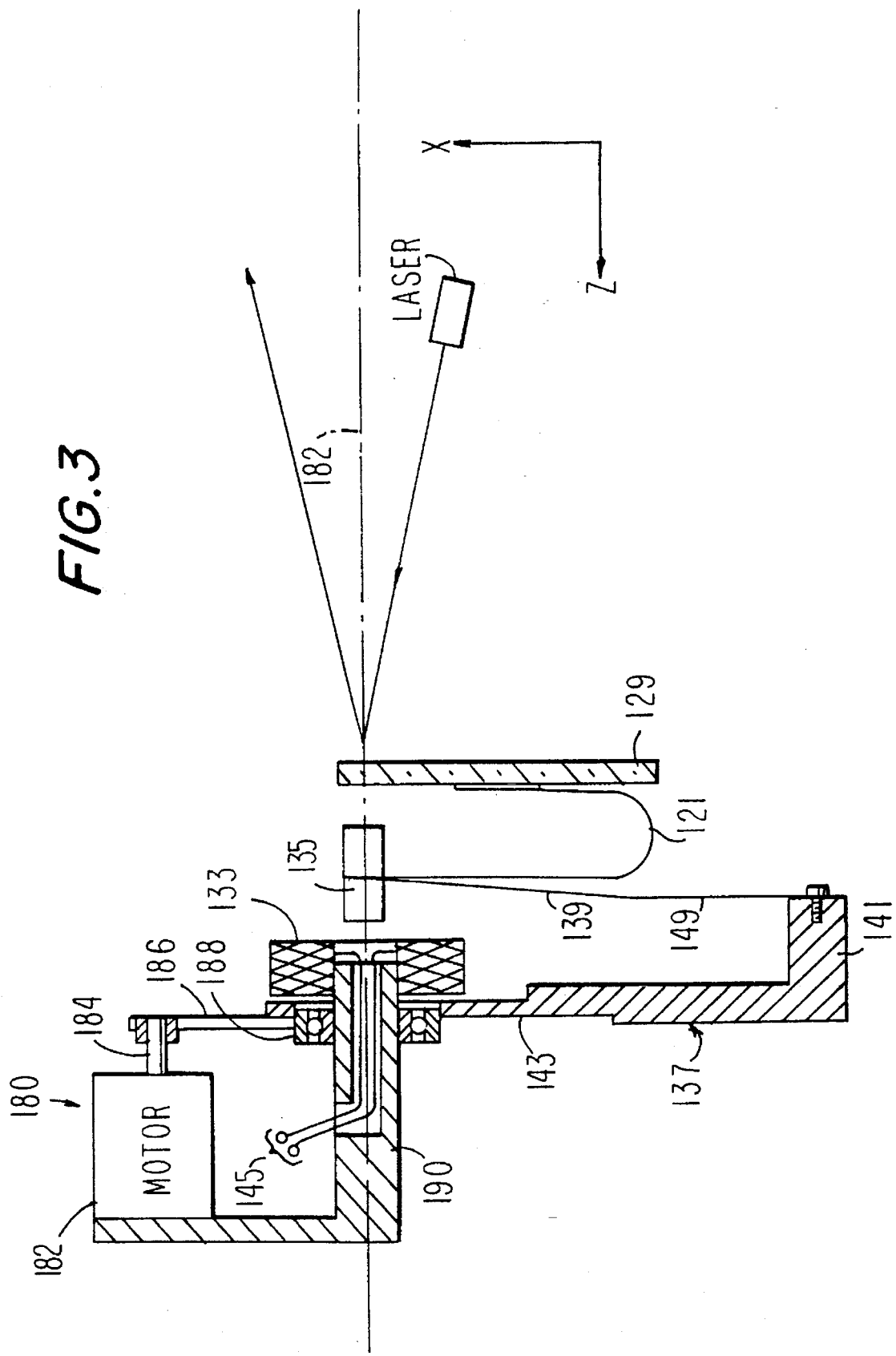

OMNI-DIRECTIONAL SCAN PATTERN GENERATOR IN ELECTRO-OPTICAL SCANNERS

This application is a continuation of application Ser. No. 08/108,521 abandoned filed Jul. 19, 1993, which is a division of Ser. No. 07/868,401 filed Apr. 14,1992, now U.S. Pat. No. 5,280,165, which is a division of Ser. No. 07/520, 464 filed May 8,1990, now U.S. Pat. No. 5,168,149, which is a continuation-in-part of Ser. No. 07/428,770, filed Oct. 30, 1989 now U.S. Pat. No. 5,099,110.

BACKGROUND OF THE INVENTION

1. Field of the Invention

This invention generally relates to a scanning arrangement in a scanner operative for repetitively scanning indicia having parts of different light reflectivity, for example, bar code symbols, and, more particularly, to operating such a scanning arrangement in single or multi-axis scan patterns.

2. Description of the Related Art

Various optical readers and optical scanners have been developed heretofore to optically read bar code symbols applied to objects in order to identify the object by optically reading the symbol thereon. The bar code symbol itself is a coded pattern comprised of a series of bars of various widths and spaced apart from one another to bound spaces of various widths, the bars and spaces having different light reflecting properties. The readers and scanners electro-optically decoded the coded patterns to multiple digit representations descriptive of the objects. Scanners of this general type have been disclosed, for example, in U.S. Pat. Nos. 4,251,798; 4,360,798; 4,369,361; 4,387,297; 4,593,186; 4,496,831; 4,409,470; 4,808,804; 4,816,661; 4,816,660; and 4,871,904, all of said patents having been assigned to the same assignee as the instant invention and being hereby incorporated herein by reference.

As disclosed in the above-identified patents and applications, a particularly advantageous embodiment of such a scanner resided, inter alia, in emitting a light beam, preferably a laser beam, emitted from a light source, preferably a gas laser or a laser diode, and in directing the laser beam to a symbol to be read. En route to the symbol, the laser beam was directed to, and reflected off, a light reflector of a scanning component. The scanning component moved the reflector in a cyclical fashion and caused the laser beam to repetitively scan the symbol. The symbol reflected the laser beam incident thereon. A portion of the incident light reflected off the symbol was collected and detected by a detector component, e.g. a photodiode, of the scanner. The photodiode had a field of view, and the detected light over the field of view was decoded by electrical decode circuitry into data descriptive of the symbol for subsequent processing. The cyclically movable reflector swept the laser beam across the symbol and/or swept the field of view during scanning.

U.S. Pat. Nos. 4,387,297 and 4,496,831 disclose a high-speed scanning component including an electric motor operative for reciprocatingly oscillating a reflector in opposite circumferential directions relative to an output shaft of the motor. Electrical power is continuously applied to the motor during scanning. The light beam which impinges on the light reflector is rapidly swept across a symbol to be scanned in a predetermined cyclical manner. The scanning component comprises at least one scan means for sweeping the symbol along a predetermined direction (X-axis) lengthwise thereof. The scanning component may also comprise another scan means for sweeping the symbol along a transverse direction (Y-axis) which is substantially orthogonal to the predetermined direction, to thereby generate a raster-type scan pattern over the symbol. In addition to a single scan line and the raster-type pattern, other types of scan patterns are also possible, such as, x-shaped, Lissajous, curvilinear (see U.S. Pat. No. 4,871,904), etc. For example, if the X and Y axis scanning motors are both driven such that the light reflectors are driven at a sinusoidally-varying rate of speed, then the scan pattern at the reference plane will be a Lissajous-type pattern for omni-directional scanning of the symbols. The use of two separate scanning motors and control means to produce the multi-axis and omni-directional scanning pattern increases material and labor costs as well as the amount of electrical power needed to operate the scanner. In addition, the relatively complicated motor shaft and bearing arrangements of the scanning components may result in a useful life that is inadequate for some applications. Furthermore, the scanning components disclosed in U.S. Pat. Nos. 4,387,297 and 4,496,831 are designed for miniature light reflectors and are not well suited for large scale reflectors.

SUMMARY OF THE INVENTION

1. Objects of the Invention

It is a general object of this invention to advance the state of the art of scanners for reading indicia of different light reflectivity, particularly laser scanners for reading bar code symbols.

An additional object of this invention is to provide novel scanning elements and novel scanning methods of operation.

Yet another object of this invention is to conveniently generate single line, multi-line or omni-directional scan patterns with the same scanning elements.

A further object of this invention is to provide a scanning arrangement having an increased scan line amplitude.

It is another object of this invention to minimize the number of elements comprising the scanning component.

Another object invention is to increase the working lifetime of the scanning components.

2. Features of the Invention

In keeping with these objects, and others which will become apparent hereinafter, this invention resides, briefly stated, in an arrangement for, and a method of, scanning indicia having parts different light reflectivity by directing light toward the indicia and by collecting reflected light returning from the indicia. This invention comprises a scanner component supported by holder means for angular oscillating movement in a single scan direction between a pair of scan end positions or alternatively, in first and second scan directions between first and second pairs of scan end positions. According to this invention, read-start means are provided for moving the component between the scan end positions.

In one feature, the component is simultaneously angularly oscillated between the first and second pair of scan end positions for directing light along the first and second scan directions to thereby effect a multi-directional scan pattern over the indicia.

In accordance with the invention, the holder means includes a tuning fork having a permanent magnet fixedly mounted on one arm of the fork and the scanner component fixedly mounted on the other arm. The read-start means is comprised of an electromagnetic coil for displacing the magnet and, in turn, for oscillating the scanner component in a scan which extends in the first direction over the indicia.

In a further embodiment of the present invention, a two-dimensional scan pattern over the indicia is advantageously effected by a holder means that is constructed for mounting the component for angular oscillating movement along first and second axes in response to a single read-start means.

In one embodiment of the invention, an omni-directional scan pattern over the indicia is provided. First and second vibratory means are arranged such that in response to a superposition of driving signals having a frequency ratio relative to each other of 5:1 or less, a Lissajous scan pattern is effected. The first vibratory means is a generally U-shaped leaf spring in which one arm is mounted to the component and the other arm is mounted to the second vibratory means which includes a generally planar leaf spring secured to the base forming a pivot line. The leaf spring includes a permanent magnet mounted on one side that cooperates with an electromagnetic coil. Mounted on the other side of the leaf spring is the U-shaped spring with the component. The direction of vibration of the leaf spring about the pivot line and the direction of vibration of the U-shaped spring are the same. In this embodiment, the weight of the U-shaped spring and component results in a torsional vibration of the planar spring oscillating the component along one scan direction and the vibration of the leaf spring about the pivot point results in the component being oscillated along a second scan direction. The simultaneous vibration in the two axes generated by the 5 to 1 or less frequency superimposed driving signal provides the Lissajous scan pattern.

In an improved construction of the U-shaped spring comprising the holder means, the angular amplitude of the scan line produced by the U-shaped spring is increased by providing the spring with asymmetrically dimensioned arms. The asymmetrically dimensioned construction may be implemented to increase the angular amplitude in either a one or two axis scan arrangement.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a cross-sectional view of yet another embodiment of a scanning arrangement according to this invention;

DETAILED DESCRIPTION OF THE PREFERRED EMBODIMENTS

Figure 1:
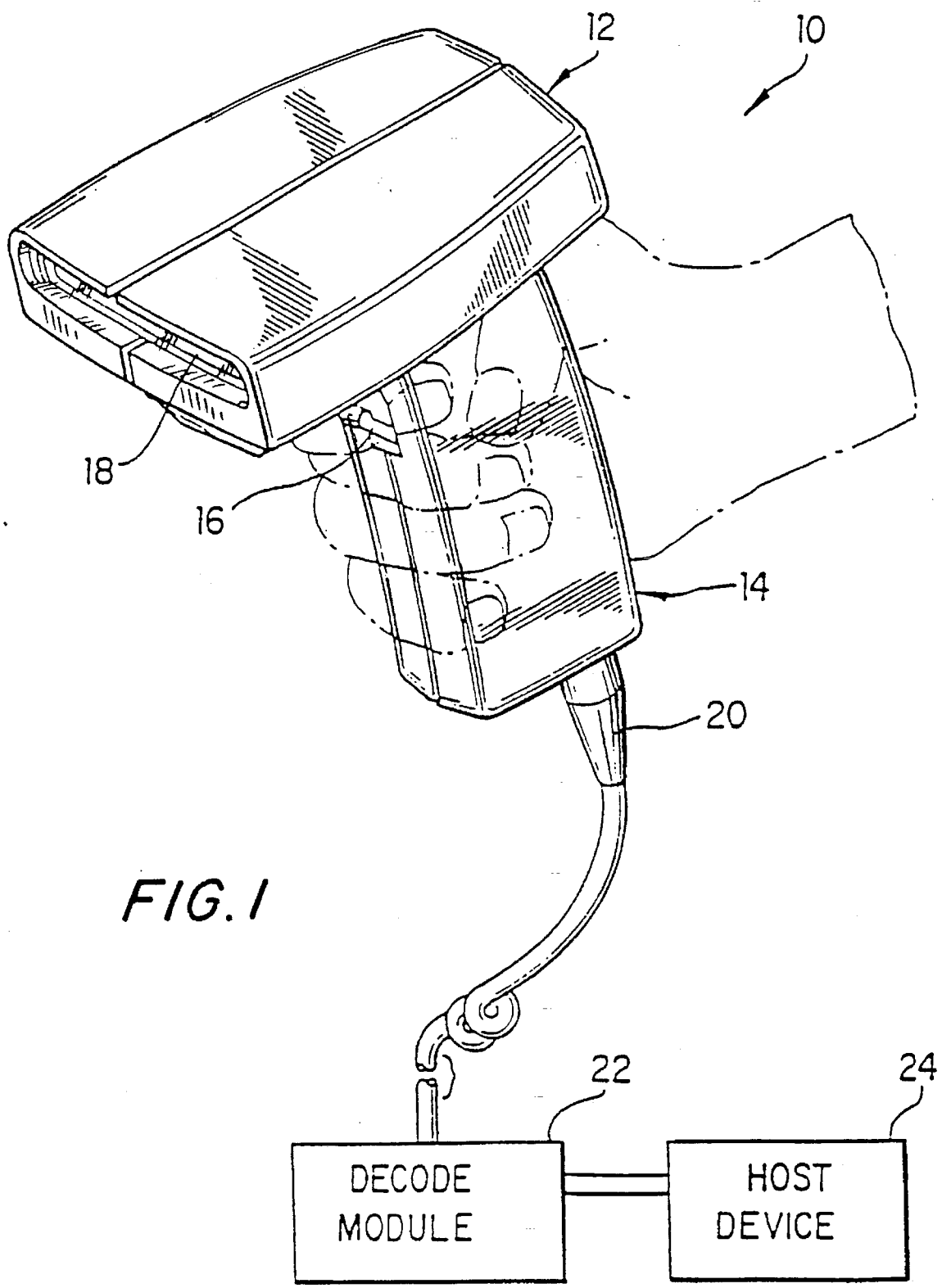
FIG. 1 is a front perspective view of hand-held head employed in a scanner.

Referring now to the drawings, as shown in FIG. 1, reference numeral 10 generally identifies a hand-held, gun-shaped scanner head having a barrel L2 and a handle 14. The head need not be gun-shaped as any suitable configuration may be used, such as box-like. A manually-operable trigger 16 is situated below the barrel 12 on an upper, forwardly-facing part the handle 14. As known from the above-identified patents and applications incorporated by collecting reflected light returning through the window 18 along a return path from the symbol.

A scanner component is mounted within the head 10, and is operative for scanning the symbol and/or the field of view of the photodetector. The scanner component includes an least one light reflector positioned in the transmission path and/or the return path. The reflector is driven by an electrically-operated drive to oscillate in alternate circumferential directions, preferably at the resonant frequency of the scanner component.

The photodetector generates an electrical analog signal indicative of the variable intensity of the reflected light. This analog signal is converted into a digital signal by an analog-to-digital converter circuit. This digital signal is conducted, according to one embodiment, along an electrical cable 20 to a decode module 22 located exteriorly of the head 10. The decode module 22 decodes the digital signal into data descriptive of the symbol. An external host device 24, usually a computer, serves mainly as a data storage in which the data generated by the decode module 22 is stored for subsequent processing.

In operation, each time a user wishes to have a symbol read, the user aims the head at the symbol and pulls the trigger 16 to initiate reading of the symbol. The trigger 16 is an electrical switch that actuates the drive means. The symbol is respectively scanned a plurality of times per second, e.g. 40 times per second. As soon as the symbol has been successfully decoded and read, the scanning action is automatically terminated, thereby enabling the scanner to be directed to the next symbol to be read in its respective turn.

In addition, the head need not be a portable hand held type as fixedly mounted heads are also contemplated in this invention. Furthermore, the heads may have manually operated triggers or may be continuously operated by direct connection to an electrical source.

The oscillations need only last a second or so, since the multiple oscillations, rather than time, increase the probability of getting a successful decode for a symbol, even a poorly printed one. The resonating reflector has a predetermined, predictable, known, generally uniform, angular speed for increased system reliability.

Figure 2:
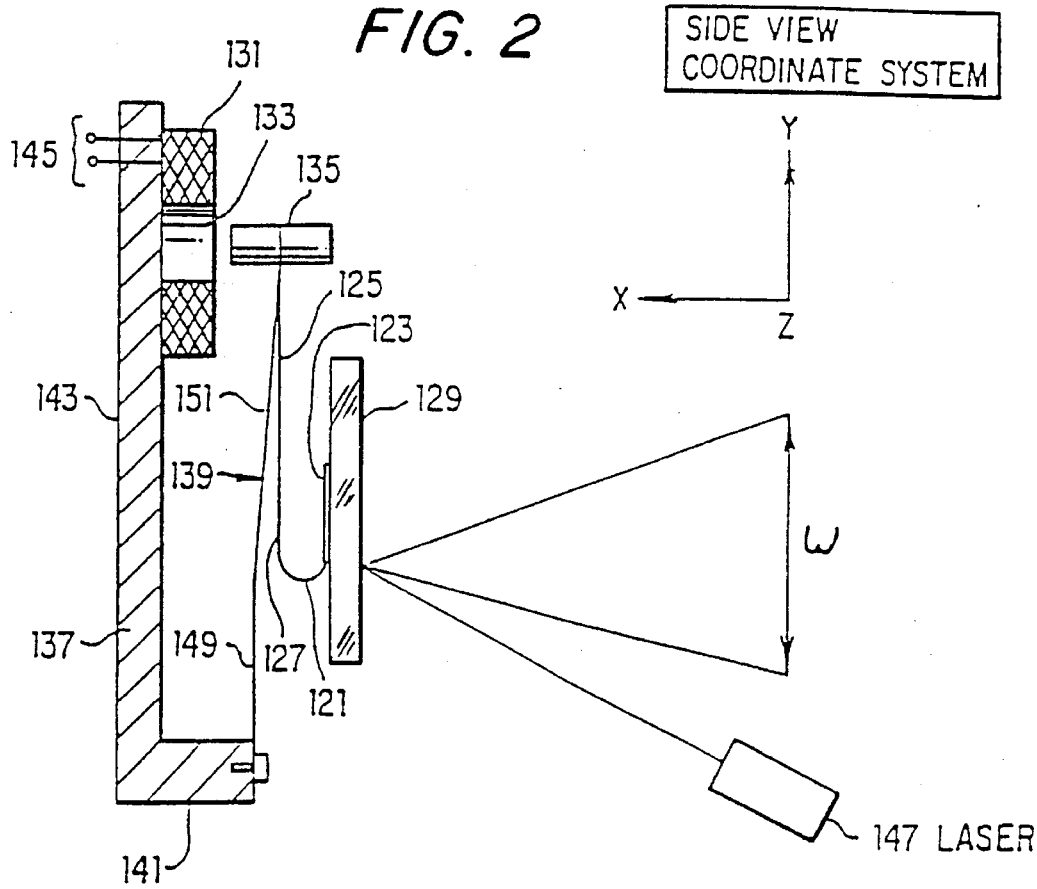
FIG. 2 is a cross-sectional view of one embodiment of the scanning arrangement according to this invention.

An example of asymmetrically dimensioned U-shaped spring is shown in FIG. 2 in which the tuning fork 121 is constructed having a small dimensioned arm 123 and a large dimensioned arm 125 which results in the nodal point 127 of the spring being positioned on arm 125 rather than at the bottom of the U as with a symmetrically dimensioned spring. As shown in FIG. 2, the component 129 is mounted to arm 123 and the actuator comprises an electromagnetic coil 131 having a passage 133 through which magnet 135 passes with clearance. The U-shaped spring 121 is secured to a support 137 by a planar spring 139. The spring 139 is secured to base section 141 and the coil 131 is mounted to wall section 143. Leads 145 are provided to apply the driving signal to the coil 131 to effect angular movement the component 129. The asymmetrically dimensioned U-shaped spring 121 provides an increased angular amplitude of the scan resulting from light directed from a laser 147 and reflected from component 129.

In addition to increasing the angular amplitude, which can be as much as a 100% increase over a symmetrically dimensioned spring, the asymmetrically dimensioned U-shaped spring provides a higher durability against metal fatigue and cracking since the nodal point is not at a curved portion of the spring. Also shown in FIG. 2, is a section 149 of spring 139 than is substantially parallel to wall 143 and section 151 angled away from wall 143 while at rest. The angled section 151 results in a further increase in the angular amplitude of scan oscillations (as much as 200% higher) over a symmetrically dimensioned U-shaped spring. Another benefit is less vibration being transferred to the base since the U-shaped spring is held only at the magnet end and angular movement of the magnet can be four times lower than that of the scanning component.

The arrangement of FIG. 2 is an elevated view showing the U-shaped spring 121 and the planar spring 139 both positioned for vibration in the x-y plane resulting in a single scan line directed along the y direction. If the U-shaped and planar springs are positioned in orthogonal planes and an appropriate superimposed high and low frequency driving signal is applied to the coil, a raster-type scan pattern will be provided with an increased x direction angular amplitude.

In certain applications, it may be desirable to scan a symbol with an omnidirectional scan pattern. One technique for obtaining an omnidirectional pattern is to view FIG. 2 as the top view of the arrangement so that gravitational forces are substantially in the Z direction. Accordingly, it can be seen that the material mass of the elements on the right hand side of spring 139 (spring 121 and component 129) is substantially greater than the mass of the elements on the left hand side of spring 129 (magnet 131). This difference in mass provides a weight imbalance that results in a torsional bending of the spring 139 that imparts an angular oscillatory movement of the component 129 in the x-z plane for effecting a z direction scan. In addition, the movement of the spring 139 towards the coil 131 and away from the coil 131 causes the U-shaped spring 121 to vibrate in the x-y plane which imparts an angular oscillatory movement to the component 129 for effecting an y direction scan.

Upon the application the superimposed driving signal, preferably comprised of a pair of sine waves having a frequency ratio in the range of 1.05:1 to 5:1, to leads 145, spring 139 torsionally vibrates at the lower frequency and the U-shaped spring 121 simultaneously vibrates at the higher frequency in such a manner that light will be reflected from the component 129 in a Lissajous scan pattern over the indicia. The Lissajous pattern is provided by the path of the light bean being oscillated in the z and y orthogonal directions in simple harmonic motions at a predetermined ratio of frequencies. Thus, an omnidirectional scan pattern is produced.

FIG. 3 shows another technique for producing an omnidirectional scan pattern namely, rotating the entire holder means about an axis. The arrangement shown in FIG. 3 is similar to that of FIG. 2 and like reference numerals are used to identify like parts and a description thereof is not repeated here for the sake of brevity. In order to rotate the entire scanning arrangement, means 180 is provided to rotate the arrangement about an axis 182. The means 180 shown in FIG. 3 is illustrative only as any suitable means for rotating the scanning arrangement about an axis may be employed to effect an omnidirectional scan pattern. The means 180 includes a meter 182 having a shaft 184 for driving a transmission belt 186. Belt 186 is coupled to a shaft (not shown) connected to the support 137 for rotating the support 137 about ball bearing 185 which is attached to support beam 190. The rotation of a single axis direction scan arrangement will produce an omnidirectional scan pattern in the form of a Rosette. The rotation of a two-axls scan arrangement will produce various other omnidirectional patterns depending on the type of two-axis arrangement rotated.

It will be understood that each of the elements described above, or two or more together, also may find a useful application in other types of constructions differing from the types described above.

While the invention has been illustrated and described as embodied in a power-saving scanning arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a system for electro-optically reading indicia with light, an apparatus for scanning the indicia with an omnidirectional scan pattern, comprising:

a) a scanner component for directing the light toward the indicia;

b) a holder for mounting the scanner component for oscillation, including a first vibratory element on which the scanner component is mounted for oscillating movement in a first plane, and a second vibratory element on which the scanner component is mounted for oscillating movement in a second plane generally orthogonal to the first plane;

c) an energizable actuator for simultaneously vibrating the elements in the respective planes, and for oscillating tile scanner component relative to the holder; and d) means for rotating the holder and the scanner component during energization of the actuator to direct the light from the scanner component in an omnidirectional scan pattern toward the indicia.

2. The apparatus according to claim 1, wherein the scanner component is a generally planar light reflector.

3. The apparatus according to claim 1, wherein the first vibratory element is a generally U-shaped spring having a first arm on which the scanner component is mounted, and a second arm.

4. The apparatus according to claim 3, wherein the arms are of different lengths.

5. The apparatus according to claim 3, wherein tile second vibratory element is a generally planar spring having a first portion mounted on the holder, and a second portion connected to the second arm of the first vibratory element.

6. The apparatus according to claim 5, wherein the second portion is angularly inclined relative to the first portion.

7. The apparatus according to claim 5, wherein the actuator includes an electro-magnetic coil member for generating a first magnetic field when energized, and a permanent magnet member for generating a second permanent magnetic field that interacts with said first field, and wherein one of said members is mounted on said second portion of the second vibratory element and on said second arm of the first vibratory element.

8. The apparatus according to claim 7, wherein said one member is the magnet member, and wherein the coil member is mounted on the holder.

9. The apparatus according to claim 7, wherein the rotating means includes an electrical motor operatively connected to the holder for uni-directionally rotating the scanner component about a rotary axis.

10. The apparatus according to claim 9, wherein the coil member has a passage extending along a longitudinal axis, and wherein the rotary is co-linear with said longitudinal axis.

11. The apparatus according to claim 9, wherein the motor has a drive shaft, and wherein the rotating means includes a transmission in force-transmitting relation between the drive shaft and the holder.

12. Apparatus for reading indicia having pints of different light reflectivity by directing a light beam toward the indicia, and by detecting a portion of the light beam reflected from the indicia, comprising:

a) a scanner component;

b) a holder for mounting tile scanner component for angular oscillating movement in at least first and second different scan directions extending between first and second pairs of scan end positions including first and second vibratory elements, said first vibratory element including a generally U-shaped spring having a pair of arms on one of which is mounted the scanner component, said second vibratory, element including a generally planar spring having one end secured to the holder, and a free end secured to the other arm of the generally U-shaped spring, said arms of the generally U-shaped spring being vibratable in a first plane, and said generally planar spring being vibratable in a second plane generally orthogonal to said first plane;

c) an actuator for simultaneously moving the scanner component in the first and second scan directions to simultaneously vibrate the springs in their respective planes and angularly oscillate the scanner component between said first and second pairs of scan end positions; and d) means for rotating tile holder and the scanner component to direct the light beam from the scanner component in an omni-directional scan pattern over the indicia.

13. Apparatus according to claim 12, wherein the arms of the generally U-shaped spring are asymmetrically dimensioned.

14. Apparatus for reading indicia having parts of different light reflectivity by directing a light beam toward tile indicia, and by detecting a portion of the light beam reflected from the indicia, comprising:

a) a scanner component;

b) a holder for mounting the scanner component for oscillating movement about an axis in alternate circumferential directions thereof between angularly spaced scan end positions, said holder including a generally U-shaped spring having a pair of arms on one of which is mounted tile scanner component, said arms of file generally U-shaped spring being asymmetrically dimensioned;

c) an actuator for oscillating the scanner component between the angularly spaced scan end positions; and d) means for rotating tile holder and the scanner component to direct the light beam from the scanner component in an omni-directional scan pattern over the indicia.

15. Apparatus for reading indicia having parts of different light reflectivity by directing a light beam toward the indicia, and by detecting a portion of tile light beam reflected from the indicia, comprising:

a) a scanner component;

b) holder means for mounting tile scanner component for oscillating movement about an axis in alternate circumferential directions thereof between angularly spaced scan end positions, said holder means including a generally U-shaped spring having a pair of arms on one of which is mounted tile scanner component, said arms of tile generally U-shaped spring being asymmetrically dimensioned;

c) read-start means for moving tile scanner component in the circumferential directions to oscillate the scanner component between tile angularly spaced scan end positions, said read-start means including an energizable electromagnetic coil having a passage, and a magnet mounted on tile generally U-shaped spring and movable towards and away from the passage during energization of the coil; and d) means for rotating tile holder and the scanner component to direct the light beam from tile scanner component in an omni-directional scan pattern over the indicia.

16. The arrangement according to claim 15, wherein the scanner component is a light reflector.

* * * * *